United States Patent
Brooks

(10) Patent No.: US 10,482,742 B2
(45) Date of Patent: Nov. 19, 2019

(54) UNIVERSAL, PROXIMITY WIRELESS SYSTEM FOR POTENTIAL VICTIM TO DISENGAGE DANGEROUS DEVICES

(71) Applicant: John R. Brooks, Orlando, FL (US)

(72) Inventor: John R. Brooks, Orlando, FL (US)

(*) Notice: Subject to any disclaimer, the term of this patent is extended or adjusted under 35 U.S.C. 154(b) by 0 days.

(21) Appl. No.: 13/998,010

(22) Filed: Sep. 24, 2013

(65) Prior Publication Data

US 2015/0084768 A1 Mar. 26, 2015

(51) Int. Cl.
*G08B 21/02* (2006.01)
(52) U.S. Cl.
CPC .................................. *G08B 21/02* (2013.01)
(58) Field of Classification Search
CPC combination set(s) only.
See application file for complete search history.

(56) References Cited

U.S. PATENT DOCUMENTS

| 7,868,721 | B2 | 1/2011 | Fullerton et al. |
| 8,373,527 | B2 | 2/2013 | Fullerton et al. |
| 2002/0082803 | A1* | 6/2002 | Schiffbauer ................... 702/159 |
| 2007/0205861 | A1* | 9/2007 | Nair et al. ................... 340/5.61 |
| 2010/0289662 | A1* | 11/2010 | Dasilva et al. ............ 340/686.6 |

* cited by examiner

Primary Examiner — Travis R Hunnings

(57) ABSTRACT

A universal proximity wireless system for a potential victim to disengage a dangerous power device to inhibit accidental injury to a potential victim includes: a) a wireless transmitter to transmit a predetermined distance; b) a transmitter attachment mechanism adapted for attachment to the potential victim; c) a receiver and a dangerous power device shutdown mechanism. The shutdown mechanism is attached to said dangerous power device at an operation mechanism of said power device and said shutdown mechanism is adapted to shut down said operation mechanism when said receiver receives a signal from said transmitter.

9 Claims, 5 Drawing Sheets

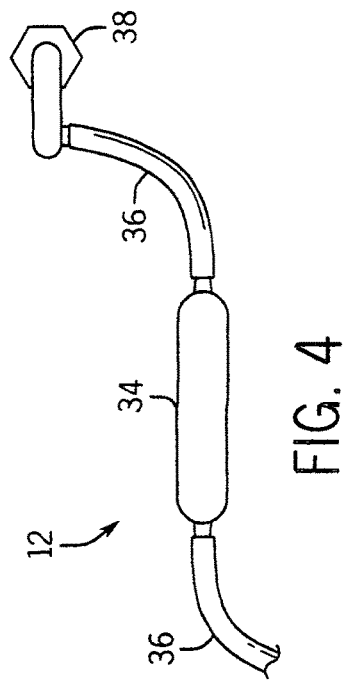
FIG. 3
FIG. 4
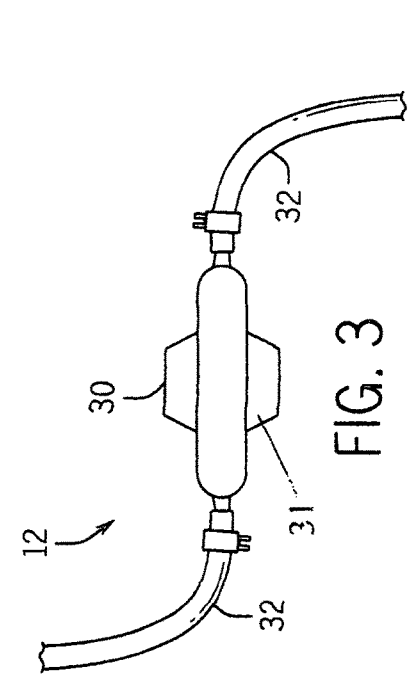
FIG. 2A
FIG. 2B
FIG. 2C
FIG. 2D

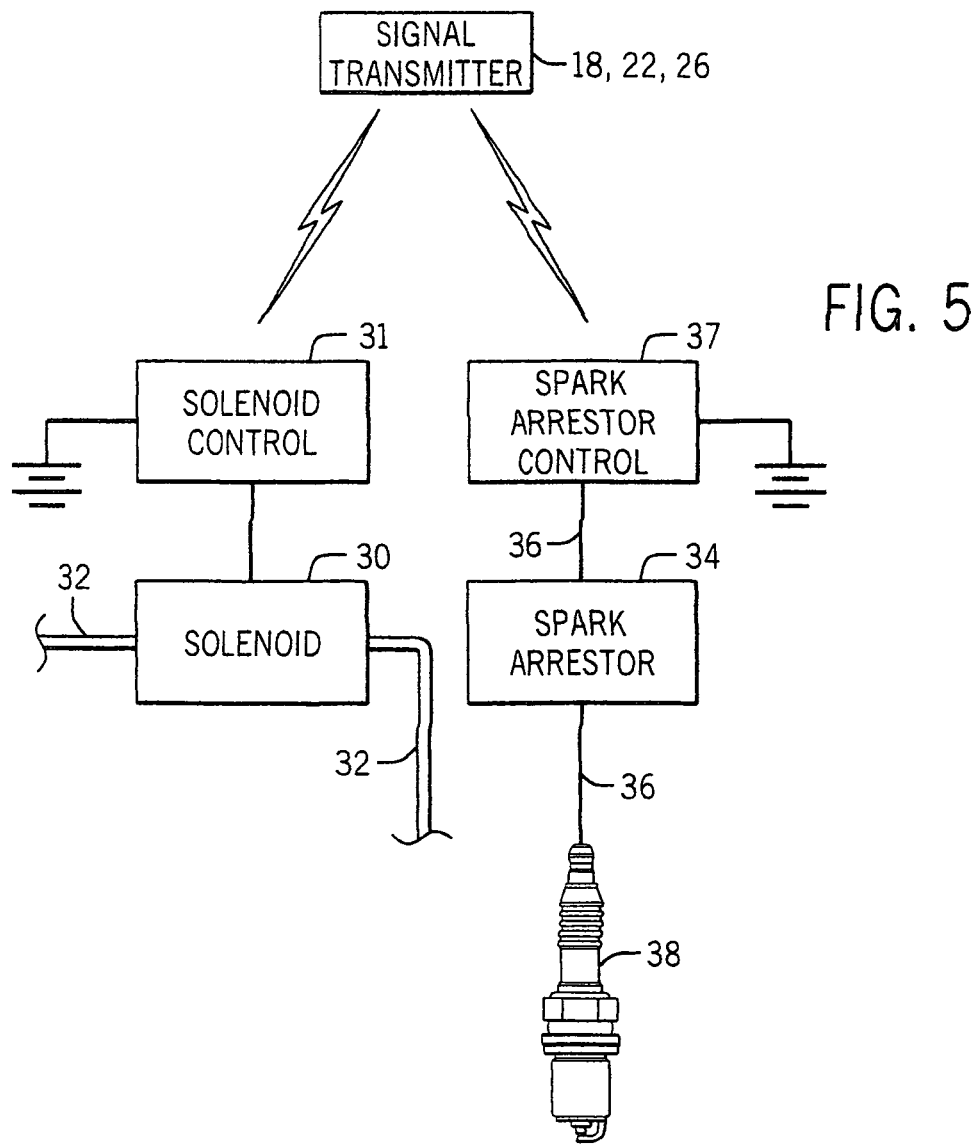

UNIVERSAL, PROXIMITY WIRELESS SYSTEM FOR POTENTIAL VICTIM TO DISENGAGE DANGEROUS DEVICES

REFERENCE TO RELATED APPLICATIONS

The present application has no related applications at this time.

BACKGROUND OF INVENTION a. Field of Invention

The present invention generally relates to a system for preventing injury to person or pet (potential victim) when unwittingly approaching a dangerous device, especially when the user of that device may be unaware of presence of and danger to that person or pet. Such dangerous devices include power tools, such as table saws and chain saws, as well as lawn mowers, tractors and farm implements. More specifically, the system of the present invention is a wireless system wherein proximity recognition causes the dangerous device to cease operation automatically. Thus, when a person, especially a youngster or small child, or a pet, carrying the signaling mechanism (transmitter) approaches a dangerous device with the receiver and shutdown mechanism, as soon as a predetermined closeness is achieved (proximity), the dangerous device will be shutdown. The receiver or other recognition means is connected to and activates the shutdown mechanism, which in turn is connected to an operation mechanism of the dangerous device, such as a power line, a power source, an electric line, an electric mechanism, a fuel line, a fuel mechanism (such as a fuel pump or a carburetor) and shuts it down when the transmitter achieves proximity. The present invention, once accepted and widely used, will prevent hundreds of thousands of injuries and deaths to person and pet. The transmitter may be applied directly to the potential victim, or as part of a person or pet accessory, e. g., a shoe, a bracelet, a collar or the like.

b. Description of Related Art

The following patents are representative of the field pertaining to the present invention:

U.S. Pat. No. 8,373,527 B2 to Fullerton et al describes an improved magnetic attachment system is that involves field emission structures having electric or magnetic field sources. The magnitudes, polarities, and positions of the magnetic or electric field sources are configured to have desirable correlation properties, which may be in accordance with a code. The correlation properties correspond to a desired spatial force function where spatial forces between field emission structures correspond to relative alignment, separation distance, and the spatial force function. Numerous potential uses for this system are listed, including attachments for extremely sharp objects moving at high rates of speed, including lawn mower blades, boat propellers, saws and others.

U.S. Pat. No. 5,842,584 B2 to Fullerton et al describes an improved field emission system and method is provided that involves field emission structures having electric or magnetic field sources. The magnitudes, polarities, and positions of the magnetic or electric field sources are configured to have desirable correlation properties, which may be in accordance with a code. The correlation properties correspond to a desired spatial force function where spatial forces between field emission structures correspond to relative alignment, separation distance, and the spatial force function. Numerous potential uses for this system are listed, including attachments for extremely sharp objects moving at high rates of speed, including lawn mower blades, boat propellers, saws and others.

Notwithstanding the prior art, the present invention is neither taught nor rendered obvious thereby.

SUMMARY OF INVENTION

The present invention is a universal proximity wireless system for a potential victim to disengage a dangerous power device to inhibit accidental injury to said potential victim. It includes: a) a wireless transmitter set to transmit a predetermined distance at a specified frequency; b) a transmitter attachment mechanism connected to said wireless transmitter and adapted for attachment to said potential victim; c) a receiver and a dangerous power device shutdown mechanism. The receiver is attached to said shutdown mechanism and said receiver is set to receive transmission from said wireless transmitter. The shutdown mechanism is attached to said dangerous power device at an operation mechanism of said power device and said shutdown mechanism is adapted to shut down said operation mechanism when said receiver receives a signal from said transmitter.

In some embodiments of the present invention universal proximity wireless system, the operation mechanism of said dangerous power device is selected from the group consisting of a fuel mechanism, a fuel line, an electric mechanism, an electric line and combinations thereof.

In some embodiments of the present invention universal proximity wireless system, the shutdown mechanism includes a disengagement solenoid.

In some embodiments of the present invention universal proximity wireless system, the transmitter attachment mechanism for attachment to said potential victim is selected from the group consisting of clothing, footwear, bracelet, necklace and headwear.

In some embodiments of the present invention universal proximity wireless system, the dangerous power device is selected from the group consisting of power tool, lawnmower, tractor and farm implement.

In some embodiments of the present invention universal proximity wireless system, the power tool is selected from the group consisting of chainsaw, table saw, portable saw and pruning saw.

In some embodiments of the present invention universal proximity wireless system, the transmitter and receiver are a radio frequency identification device system.

In some embodiments of the present invention universal proximity wireless system, the radio frequency identification device system is selected from the group consisting of a passive reader-active tag system, an active reader-passive tag system, and an active reader-active tag system.

In some embodiments of the present invention universal proximity wireless system, the receiver is functional when said dangerous power device is operational, and when it is not operational so as to prevent injurious start up.

In some embodiments of the present invention universal proximity wireless system, the transmitter attachment mechanism is selected from the group consisting of pet clothing, pet collar and pet implant.

In some other embodiments of the present invention, it is the system including a proximity sensor. In these embodiments, the universal proximity wireless system for a potential victim to disengage a dangerous power device to inhibit accidental injury to said potential victim includes: a) a wireless transmitter set to transmit at a specified frequency; b) a transmitter attachment mechanism connected to said wireless transmitter and adapted for attachment to said potential victim; c) a receiver and a dangerous power device shutdown mechanism, said receiver attached to said shutdown mechanism and said receiver set to receive transmission from said wireless transmitter, said shutdown mechanism attached to said dangerous power device at an operation mechanism of said power device and said shutdown mechanism adapted to shut down said operation mechanism when said receiver receives a signal from said transmitter; and d) a proximity sensor connected to one of said transmitter and said receiver and set to activate one of said transmitter and said receiver when said receiver and said transmitter are positioned within a predetermined proximity of one another. All of the other details, options and preferred embodiments are the same as set forth herein above in the preceding paragraphs.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed. For example, although the invention is described as the transmitter being attached to the potential victim and the receiver being attached to the dangerous power device.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 2A is a front perspective view of a present invention transmitter and transmitter attachment mechanism for a pet, used as one possible component of the present invention universal proximity wireless system for a potential victim to disengage a dangerous power device to inhibit accidental injury to said potential victim;

FIG. 2B is a front perspective view of a present invention transmitter and transmitter attachment mechanism for a person's wrist, used as one possible component of the present invention universal proximity wireless system for a potential victim to disengage a dangerous power device to inhibit accidental injury to said potential victim;

FIG. 2C is a front perspective view of a present invention transmitter and transmitter attachment mechanism for a person's pants, shirt or coat pocket, used as one possible component of the present invention universal proximity wireless system for a potential victim to disengage a dangerous power device to inhibit accidental injury to said potential victim;

FIG. 2D is a partial top view of a present invention transmitter and transmitter attachment mechanism for a person's laced footwear, used as one possible component of the present invention universal proximity wireless system for a potential victim to disengage a dangerous power device to inhibit accidental injury to said potential victim;

FIG. 3 is a side view of a present invention fuel shut off unit and receiver that is one set of components useful in the present invention universal proximity wireless system;

FIG. 4 is a side view of a present invention electrical shut off unit and receiver that is one set of components useful in the present invention universal proximity wireless system;

FIG. 5 is a schematic diagram of the components and their connective/functional relationships of one preferred embodiment of the present invention universal proximity wireless system;

DETAILED DESCRIPTION OF THE EMBODIMENTS

Figure 1:
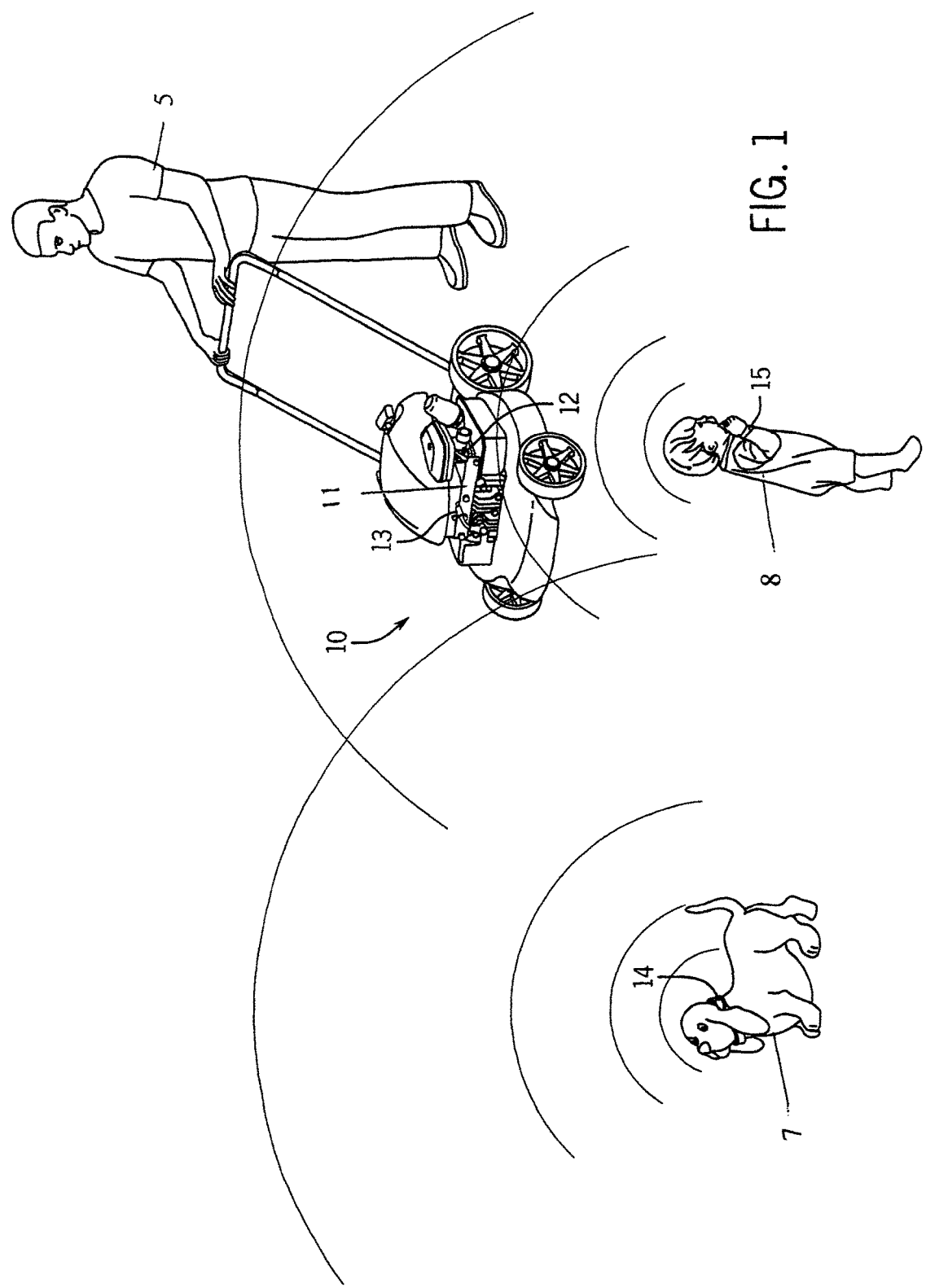
FIG. 1 is a perspective view of an embodiment of a present invention universal proximity wireless system for a potential victim to disengage a dangerous power device to inhibit accidental injury to said potential victim, showing conceptual operation of the system.

The present invention is a system has a strictly humanitarian primary objective. Specifically, the present invention has been created and evolved to prevent or inhibit injuries, serious injuries, loss of limbs and loss of life for people and pets, and especially for the less alert-children, special needs persons and pets. The present invention is a system for preventing injury to potential victims (person or pet) when nearing a dangerous power device, especially when the user of that device may be unaware of presence of and danger to that person or pet. Such dangerous devices include power tools, as well as mowers, tractors and farm machinery. The invention is a wireless system wherein proximity recognition through wireless communication stops the dangerous device automatically. Thus, when a person, especially a youngster or small child, or a pet, carrying the signaling mechanism (transmitter or similar device) approaches a dangerous power device with the receiver (or equivalent) and shutdown mechanism, as soon as a predetermined closeness is achieved (proximity), the dangerous device will be shutdown. The receiver or other recognition means is connected to and activates the shutdown mechanism, which in turn is connected to an operation mechanism of the dangerous device.

Referring now to the drawings to illustrate some of the preferred embodiments of the present invention, these drawings are intended to be illustrative and not limiting the scope of the invention.

FIG. 1 is a perspective view of an embodiment of a present invention universal proximity wireless system for potential victims pet dog 7 and toddler 8 to disengage a dangerous power device, lawn mower 10 to inhibit accidental injury to the potential victims. Lawn mower 10 is operated by gentleman 5, and pet dog 7 and toddler 8 have been playing in the yard away from lawnmower 10. They are armed with transmitter units 14 and 15, respectively. The gentleman 5 is focused on the lawn mower 10 and does not see the potential victims.

As the pet dog 7 and the toddler 8 approach the lawn mower 10, and get within, for example, 12 feet of the lawnmower 10, the transmitter units 14 and 15 send signals to the receiver unit 11 and the receiver unit 11 activates automatic shutoff mechanism(s). In this case, two shutoff mechanisms are included—a fuel shutoff unit 12, and an electrical line shutoff unit 13. Both are shut down and the pet dog 7 and the toddler 8 are safe from accidental injuries or death.

FIG. 2A is a front perspective view of a present invention of transmitter unit 14 of FIG. 1. It includes transmitter 18 and transmitter 18 is attached to dog collar 16 (the transmitter attachment mechanism) for a pet, such as pet dog 7 of FIG. 1.

FIG. 2B is a front perspective view of a present invention transmitter unit 15 of FIG. 1. It includes transmitter 22, which is attached to wristlet 22 (the transmitter attachment mechanism) to be worn by a person such as toddler 8 of FIG. 1.

FIG. 2C is a front perspective view of an alternative transmitter unit 24. It includes a transmitter 26 and transmitter attachment mechanism 28, in this case, a clip, for attachment to a pocket, a shirt, pants, belt, hat of a person, or to any other adornment to which it may be connected, to be used as one possible component of the present invention universal proximity wireless system for a potential victim to disengage a dangerous power device to inhibit accidental injury to said potential victim.

FIG. 2D is a partial top view of another alternative present invention transmitter unit. It includes a transmitter 27 connected to eyelets 29 (the transmitter attachment mechanism) for a person's laced footwear, as shown. It is used as one possible component of the present invention universal proximity wireless system for a potential victim to disengage a dangerous power device to inhibit accidental injury to said potential victim.

FIG. 3 is a side view of a present invention fuel shut off unit 12. It has a receiver 30 that receives a signal from a transmitter such as are described above. When such a signal (proximity signal) is received, solenoid 31 is activated and automatically shuts down fuel lie 32, thereby causing the dangerous power device to cease operating FIG. 4 is a side view of a present invention electrical shut off unit 12 with and encasement 34 that contains both a receiver and an electric shut off and responds to a transmitter being recognized in its vicinity, i.e., it arrests electrical power, e.g., to an electric motor or to a spark plug (acting as a spark arrestor) that fires a gasoline or diesel or gas engine.

FIG. 5 is a schematic diagram of the components and their connective/functional relationships of one preferred embodiment of the present invention universal proximity wireless system. Here transmitter 18, 22, 26 is that of any of FIGS. 2A, 2B and 2C as set forth above, or it could be any other transmitter described herein. The transmitter sends a signal to receiver 31 (in this case a solenoid control) and/or to receiver 37 (in this case a spark arrestor control) which in turn activates operational cessation of the fuel line or spark plug (numbered as in the preceding Figures). These are representative possibilities and others are described below. These components could be attached to any dangerous power device and potential victims. A universal frequency would be preferred as in such case a potential victim's transmitter could disengage any dangerous device that is able to recognize that universal frequency as a proximity emergency shut off activator.

Although transmitters and receivers have been described above generically, radio frequency ID systems represent some preferred embodiments. Various types of RFID systems can be used as components of the present invention and RFID systems are classified by the type of tag and reader. A Passive Reader Active Tag (PRAT) system has a passive reader which only receives radio signals from active tags (battery operated, transmit only). The reception range of a PRAT system reader can be adjusted from 1-2,000 feet, allowing flexibility in applications such as the present invention systems. An Active Reader Passive Tag (ARPT) system has an active reader, which transmits interrogator signals and also receives authentication replies from passive tags. An Active Reader Active Tag (ARAT) system uses active tags awoken with an interrogator signal from the active reader. A variation of this system could also use a Battery-Assisted Passive (BAP) tag which acts like a passive tag but has a small battery to power the tag's return reporting signal. Fixed readers are set up to create a specific interrogation zone which can be tightly controlled. This allows a highly defined reading area for when tags go in and out of the interrogation zone. Mobile readers (receivers) may be thus be attached to the controls and shut off mechanisms of the present invention described herein.

Figure 6:
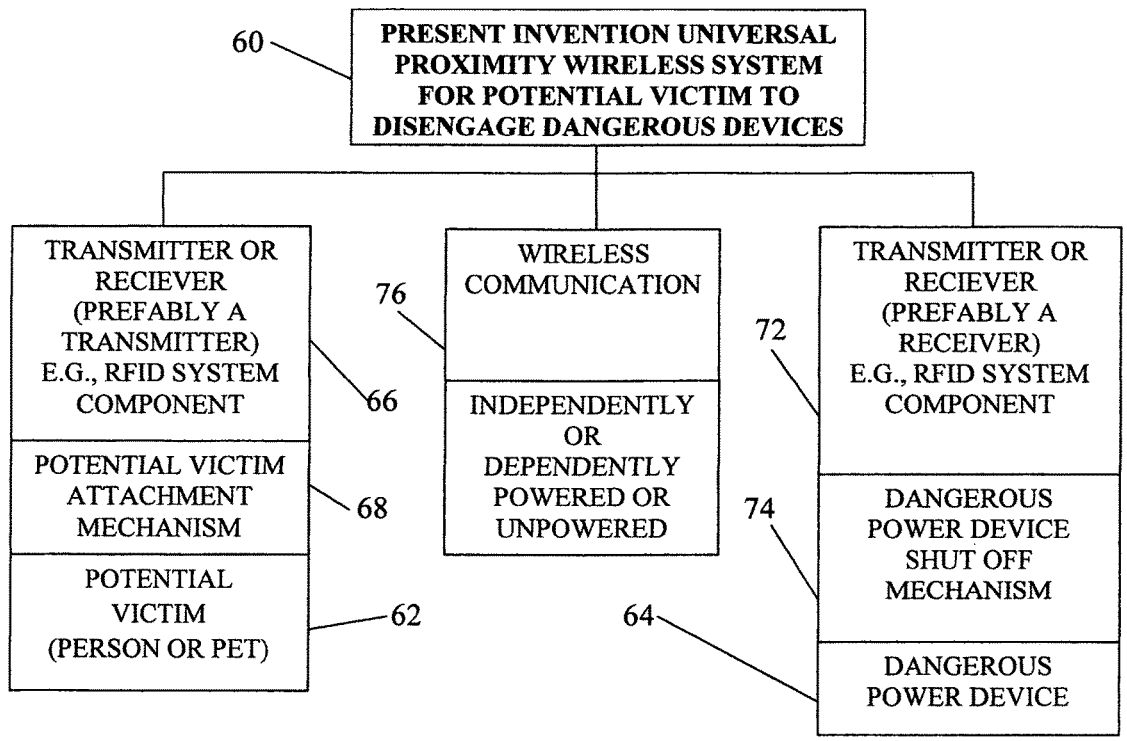
FIG. 6 is a schematic diagram of the components and their connective/functional relationships of multiple preferred embodiments of the present invention universal proximity wireless system.

FIG. 6 is a schematic diagram of the components and their connective/functional relationships of multiple preferred embodiments of the present invention universal proximity wireless system 60. The potential victim 62 is unconnected to and has no control over dangerous power device 64. The user or operator of device 64 is unaware of the potential victim 62. A transmitter 66 (or receiver with a rebound or return signal) is attached to an attachment mechanism 68, which in turn is attached to the potential victim 62. Dangerous power device 64 has a shut off mechanism 74 attached to it, which itself is connected to a receiver 72. There is wireless communication 76 between the transmitter 66 and the receiver 72, either or both of which may be powered or unpowered, but is preferably powered and has its own power, e.g., a battery, cell or solar unit, but may use power from the dangerous power device 64. When the victim 62 approaches the power device 64, the signal or bounce-back signal is recognized and shut off mechanism 74 shuts down the power device 64. Although it is rendered as ceasing operation, it may preferably auto reset for subsequent restart without additional action or steps to be taken.

Figure 7:
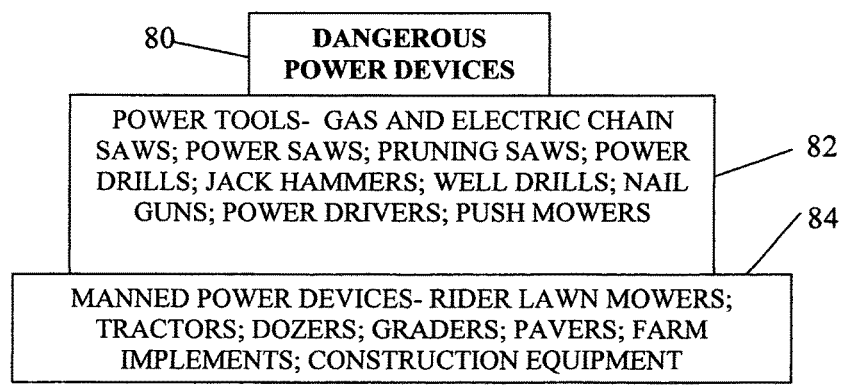
FIG. 7 is a schematic diagram of the examples of dangerous power devices included in the present invention universal proximity wireless system.

FIG. 7 is a schematic diagram of the examples of dangerous power devices 80 included in the present invention universal proximity wireless system. These include power tools 82, such as gas and electric chain saws; power saws; pruning saws; power drills; jack hammers; well drills; nail guns; power drivers and push mowers. These also include manned power devices 84, such as rider lawn mowers; tractors; dozers; graders; pavers; farm implements; construction equipment, as well as trade specific power devices, such as welders and plumbers (such as power pipe threaders).

Figure 8:
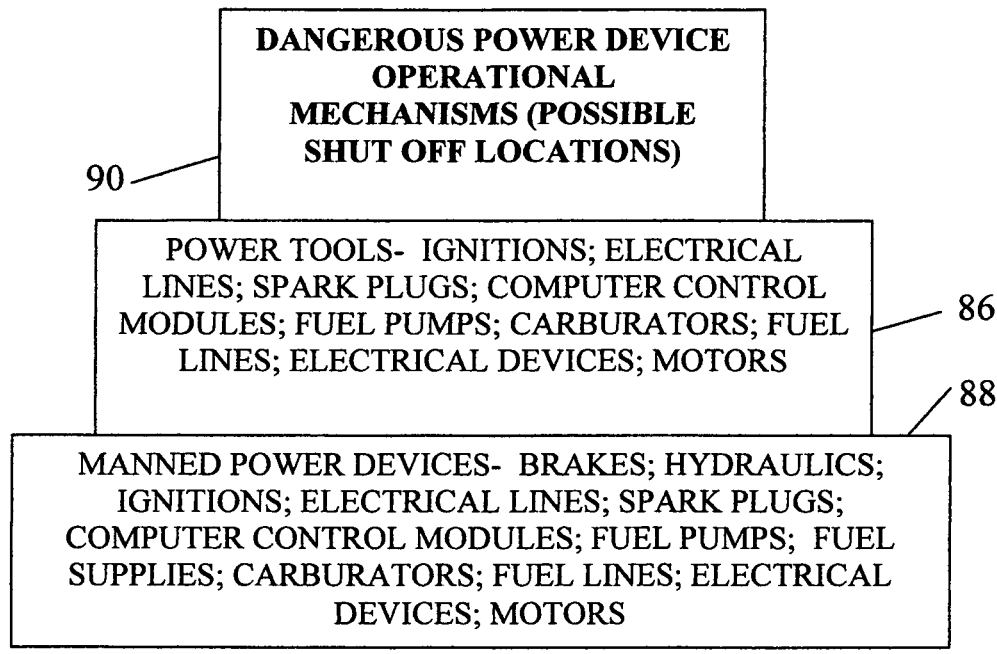
FIG. 8 is a schematic diagram of the examples of operation mechanisms of the dangerous power devices included in the present invention universal proximity wireless system; and, FIG. 9 is a schematic diagram of the examples of attachment mechanisms of the dangerous power devices included in the present invention universal proximity wireless system.

FIG. 8 is a schematic diagram of the examples of operational mechanisms 90 (possible shut off locations) of the dangerous power devices included in the present invention universal proximity wireless system. For power tools 86, shut off operational mechanisms include ignitions; electrical lines; spark plugs; computer control modules; fuel pumps; carburetors; fuel lines; electrical devices motors. For manned power devices 88, shut off mechanisms include brakes; hydraulics; ignitions; electrical lines; spark plugs; computer control modules; fuel pumps; fuel supplies; carburetors; fuel lines; electrical devices; motors.

Figure 9:
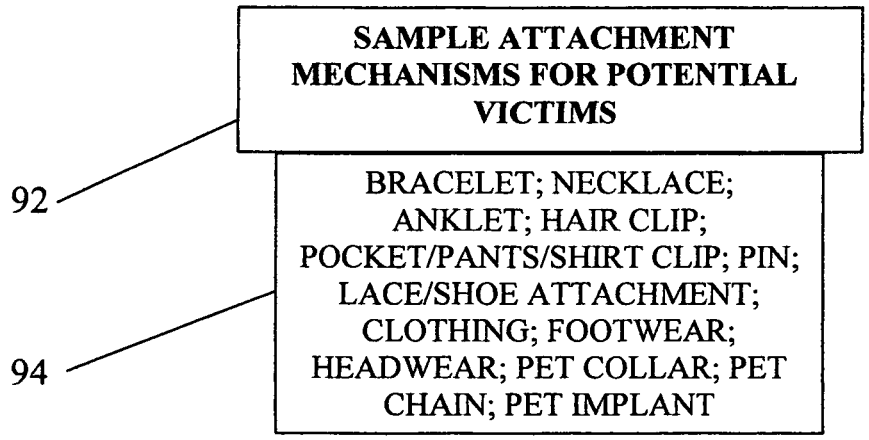

FIG. 9 is a schematic diagram of the examples of attachment mechanisms 92 of the dangerous power devices included in the present invention universal proximity wireless system. These include, but are not limited to, attachment mechanisms 94: bracelet; necklace; anklet; hair clip; pocket/pants/shirt clip; pin; lace/shoe attachment; clothing; footwear; headwear; pet collar; pet chain; pet implant.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, in some cases the potential victim could be the user of the device. Professional lawn cutters could wear wristlets or other devices with transmitters and the proximity could be set for one foot. When they step off the lawn mower and go to the cutting deck to pull blockage from a stuck blade, or when the operator thought the blades had stopped but didn't and started to reach toward the blades, the device would automatically shut down power to prevent amputation or injury. The shut-down would also occur if the operator fell off the mower, e.g, if there were a height shield so that the receiver could only see the transmitter if it were on or near the ground. Other variations are within the scope of the present invention.

What is claimed is:

1. A universal proximity wireless system for a potential victim to disengage a dangerous power device to inhibit accidental injury to said potential victim, which comprises:
   a) a wireless transmitter set to transmit a signal over a predetermined distance at a specified frequency;
   b) a transmitter attachment mechanism connected to said wireless transmitter and adapted for attachment to said potential victim;
   c) a spark arrestor control comprising a receiver operable to receive said signal from said transmitter, and upon receipt of said signal from said transmitter, to operate a spark arrestor configured to arrest electrical power to a spark plug of the dangerous power device and shut down operation of the dangerous power device.

2. The universal proximity wireless system of claim 1 wherein said receiver is operable to receive said signal from said transmitter only when said transmitter is within said predetermined distance from said receiver.

3. The universal proximity wireless system of claim 2 wherein said predetermined distance is adjustable.

4. The universal proximity wireless system of claim 1 wherein said receiver is functional when said dangerous power device is operational, and when it is not operational so as to prevent injurious start up.

5. A universal proximity wireless system for a potential victim to disengage a dangerous power device to inhibit accidental injury to said potential victim, which comprises:
   a) a wireless transmitter set to transmit at a specified frequency;
   b) a transmitter attachment mechanism connected to said wireless transmitter and adapted for attachment to said potential victim;
   c) a spark arrestor control comprising a receiver operable to receive said signal from said transmitter, and upon receipt of said signal from said transmitter, to operate a spark arrestor configured to arrest electrical power to a spark plug of the dangerous power device and shut down operation of the dangerous power device; and
   d) a proximity sensor connected to one of said transmitter and said receiver and set to activate one of said transmitter and said receiver when said receiver and said transmitter are positioned within a predetermined proximity of one another.

6. The universal proximity wireless system of claim 5 wherein said predetermined proximity is adjustable.

7. The universal proximity wireless system of claim 5 wherein said receiver is functional when said dangerous power device is operational, and when it is not operational so as to prevent injurious start up.

8. A universal proximity wireless system for a potential victim to disengage a dangerous power device to inhibit accidental injury to said potential victim, which comprises:
   a) a wireless transmitter set to transmit a predetermined distance at a specified frequency;
   b) a receiver;
   c) a receiver attachment mechanism connected to said receiver and adapted for attachment to said potential victim;
   d) a dangerous power device shutdown mechanism, said transmitter attached to said shutdown mechanism and said transmitter set to send a transmission from said wireless transmitter to said receiver and to recognize when said transmission is received, said shutdown mechanism comprising a spark arrestor control operable to receive a signal from said transmitter, and upon receipt of said signal from said transmitter, to operate a spark arrestor configured to arrest electrical power to a spark plug of the dangerous power device and shut down operation of the dangerous power device when said transmitter recognizes that a signal was received by said receiver.

9. The universal proximity wireless system of claim 8 wherein said predetermined distance is adjustable.

\* \* \* \* \*